United States Patent
Park (10) Patent No.: US 10,778,434 B2
(45) Date of Patent: Sep. 15, 2020

(54) SMART LOGIN METHOD USING MESSENGER SERVICE AND APPARATUS THEREOF

(71) Applicant: ROUMIT CO., LTD, Seoul (KR)

(72) Inventor: Seung Hyun Park, Seoul (KR)

(73) Assignee: ROUMIT CO., LTD, Seoul (KR)

( * ) Notice: Subject to any disclaimer, the term of this patent is extended or adjusted under 35 U.S.C. 154(b) by 72 days.

(21) Appl. No.: 15/766,374

(22) PCT Filed: Nov. 14, 2017

(86) PCT No.: PCT/KR2017/012836
§ 371 (c)(1),
(2) Date: Apr. 6, 2018

(87) PCT Pub. No.: WO2018/151392
PCT Pub. Date: Aug. 23, 2018

(65) Prior Publication Data
US 2019/0089538 A1    Mar. 21, 2019

(51) Int. Cl.
*G06F 21/00* (2013.01)
*H04L 9/32* (2006.01)
(Continued)

(52) U.S. Cl.
CPC ............ *H04L 9/3226* (2013.01); *G06F 21/31* (2013.01); *G06F 21/32* (2013.01); *G06F 21/45* (2013.01);
(Continued)

(58) Field of Classification Search
CPC .................... G06F 21/31–32; H04L 9/3226
(Continued)

(56) References Cited

U.S. PATENT DOCUMENTS

2003/0018718 A1*  1/2003  Maehiro ............. H04L 12/1822
709/205
2013/0145447 A1   6/2013  Maron
(Continued)

FOREIGN PATENT DOCUMENTS

KR  10-2006-0102456 A  9/2006
KR  10-2014-0121041 A  10/2014
(Continued)

OTHER PUBLICATIONS

International Search Report for PCT/KR2017/012836 dated Mar. 6, 2018 from Korean Intellectual Property Office.

*Primary Examiner* — Anthony D Brown
(74) *Attorney, Agent, or Firm* — Revolution IP, PLLC (57) ABSTRACT

A smart login method using messenger service according to the present invention may include receiving login request information from a service server by a transmitter-receiver unit of an authentication server; generating authentication request information matching to the login request information by a data management unit of the authentication server; transmitting the authentication request information to a messenger server by the transmitter-receiver unit; receiving authentication information from the messenger server by the transmitter-receiver unit; generating login information matching to the authentication information by the data management unit; and transmitting the login information to the service server by the transmitter-receiver unit.

18 Claims, 3 Drawing Sheets

(51) Int. Cl.
*H04W 12/06* (2009.01)
*G06F 21/32* (2013.01)
*G06F 21/45* (2013.01)
*H04L 12/58* (2006.01)
*G06F 21/31* (2013.01)
*H04L 29/06* (2006.01)

(52) U.S. Cl.
CPC ............ *H04L 51/04* (2013.01); *H04L 51/046* (2013.01); *H04L 63/0853* (2013.01); *H04W 12/06* (2013.01); *H04L 63/0861* (2013.01); *H04L 63/18* (2013.01); *H04L 2209/80* (2013.01)

(58) Field of Classification Search
USPC ............................................................ 726/7
See application file for complete search history.

(56) References Cited

U.S. PATENT DOCUMENTS

| | | | |
|---|---|---|---|
| 2013/0198304 A1* | 8/2013 | Jung | .................. H04L 12/1818 709/206 |
| 2016/0323325 A1 | 11/2016 | Nie et al. | |
| 2017/0048240 A1* | 2/2017 | Chang | ..................... G06F 21/32 |

FOREIGN PATENT DOCUMENTS

| KR | 10-2015-0124931 A | 11/2015 |
|---|---|---|
| KR | 10-2016-0106119 A | 9/2016 |

\* cited by examiner

SMART LOGIN METHOD USING MESSENGER SERVICE AND APPARATUS THEREOF

TECHNICAL FIELD

The present invention relates to a smart login method and an apparatus thereof, and more specifically, to a smart login method using messenger service and an apparatus thereof.

BACKGROUND ART

Services provided through internet homepage or the like may be used generally through process called login. For login, user's information is provided through member joining procedure, and information of ID, password, or the like for login is generated.

Since each of internet sites has separate operation subjects, ID and password is also managed separately, respectively. Each of internet sites guides periodically to change password generated at the time of joining to maintain security. Besides the password change, as a secondary security means, there is a case of SMS authentication key method or a case of providing security application separately. Due to change the password in periodic or non-periodic base for security reinforcement, there may be generated some trouble that user should manage the password separately.

And, in case that a separate guidance service for access status on access to an internet site is not provided, an internet site login may be established by a third person in a state that the user does not know. In case of login by social login method, the login at Naver, KakaoTalk, Facebook or the like may be realized through account sharing, by which there may exist a login realization without user's recognition, or a piracy possibility of account.

In case of password storage tool method, a password management through a toolbar password storage function, browser password storage function or password application may be exampled. An automatic storage method may be vulnerable to security since other users may be able to access. In case of toolbar or password application, change in password is also needed for hacking prevention or the like, which causes inconvenience.

DISCLOSURE

Technical Problem

A smart login method using messenger service according to an embodiment of the present invention has an object to provide a smart login method using messenger service and apparatus thereof which enables login to a service provided through internet site or the like through a messenger service, by which process of login is realized on the messenger service.

A smart login method using messenger service according to another embodiment of the present invention has an object to solve that there exist risk of exposure and piracy in writing matters somewhere to solve that social cost and loss is considerably large according to severe inconveniences that occur in many cases including an inconvenience that user has to remember separate ID and passwords for plurality of sites or has to manage in writing them separately, a problem that user has to manage continually passwords which have to be changed subsequently once periodically by every month or every several months, an inconvenience that user has to find out the ID and password through search functions for ID and password every time in case of site not visited frequently in a situation that passwords have to be managed plurality of types according to different password systems by site, and an inconvenience that user has to notify the password after change to other password beforehand and has to change again after finishing to avoid a risk that my password system can be exposed to an opponent party in case that login to my account has to be allowed to a third person temporarily.

And, a smart login method using messenger service according to further another embodiment of the present invention has an object to provide a smart login method and apparatus thereof which can be innovative in that user can control the login that is not recognized by oneself not to be realized since user can be notified beforehand all about login in case of realization of login on internet sites where user joined, in that there is no password storage comparing to a method that a relay server alone or a simple application stores password of existing website by constructing authentication structure dispersed into third organizations and media, relay servers, and websites of messenger service though there exists a risk of exposure of content through communication hacking in case of simple short message service, and in that safety is reinforced, convenience of user is maximized, and especially authentication is possible without remembering password anymore because of usage of newly created strong security authentication means through messenger.

The objects of the present invention are not limited to the matters described above, but other objects not cited above may be understood clearly from the description below by a person having an ordinary knowledge in the technical field where the present invention pertains.

Technical Solution

A smart login method using messenger service according to an aspect of the present invention to solve the technical problems may include receiving login request information from a service server by a transmitter-receiver unit of an authentication server; generating authentication request information matching to the login request information by a data management unit of the authentication server; transmitting the authentication request information to a messenger server by the transmitter-receiver unit; receiving authentication information from the messenger server by the transmitter-receiver unit; generating login information matching to the authentication information by the data management unit; and transmitting the login information to the service server by the transmitter-receiver unit.

And, transmitting the login information to the service server further includes transmitting the login information to a security server by the transmitter-receiver unit.

And, transmitting login status information corresponding to the login information to the messenger server through the transmitter-receiver unit by the data management unit may be further included.

And, transmitting the authentication request information may further includes transmitting authority restriction verification information to the messenger server through the transmitter-receiver unit by the data management unit; and receiving authority restriction information from the messenger server through the transmitter-receiver unit to transmit service restriction request information according to the authority restriction information to the service server.

And, the service restriction request information may be any one of login cancellation information, usage time restriction information and function restriction information.

And, the authentication information may be generated using any one of text information, fingerprint recognition information, pattern recognition information, voice recognition information and iris recognition information.

And, the login request information may be a personal identification number, telephone number information or ID information.

And, the data management unit may have login maintenance verification information be transmitted to the messenger server through the transmitter-receiver unit by a preset time interval.

And, receiving the login request information may further includes receiving third user temporary usage application information from the service server to transmit to the messenger server.

A smart login apparatus using messenger service according to another aspect of the present invention may be provided to comprise a transmitter-receiver unit of an authentication server for transmitting and receiving data; and a data management unit electrically connected to the transmitter-receiver unit to manage data, wherein when the transmitter-receiver unit receives login request information from a service server, the data management unit generates authentication request information matching to the login request information; after the transmitter-receiver unit transmits the authentication request information to a messenger server, when the transmitter-receiver unit receives authentication information from the messenger server, the data management unit generates login information matching to the authentication information and the transmitter-receiver unit transmits the login information to the service server.

A smart login method using messenger service according to another aspect of the present invention may include receiving login request information from a service server by a transmitter-receiver unit of an authentication server; generating authentication request information matching to the login request information by a data management unit of the authentication server; transmitting the authentication request information to a messenger server by the transmitter-receiver unit; generating a first authentication information using the authentication request information by the data management unit; receiving a second authentication information from the service server by the transmitter-receiver unit; generating a login information matching to the first authentication information or the second authentication information by the data management unit in case that the data management unit verifies matching of the first authentication information and the second authentication information; and transmitting the login information to the service server by the transmitter-receiver unit.

And, the second authentication information may be transmitted from the messenger server.

A smart login apparatus using messenger service according to another aspect of the present invention may be provided to include a transmitter-receiver unit of an authentication server for transmitting and receiving data; and a data management unit connected electrically to the transmitter-receiver unit to manage data, wherein when the transmitter-receiver unit receives a login request information from a service server, the data management unit of the authentication server generates an authentication request information matching to the login request information; after the transmitter-receiver unit transmits the authentication request information to a messenger server, when the data management unit generates a first authentication information using the authentication request information and the transmitter-receiver unit receives a second authentication information from the service server, the data management unit verifies matching of the first authentication information and the second authentication information to generate a login information matching to the first authentication information or the second authentication information and the transmitter-receiver unit transmits the login information to the service server.

Advantageous Effects

The smart login method using messenger service according to an embodiment of the present invention may enable login to services provided through internet sites or the like through a messenger service, which is an authentication method not using the password of the site, by which login is enabled conveniently without remembering password, multiple media authentication through website, relay system and messenger is constructed to provide much stronger security method, and strong security function may be provided since password or the like does not exposed at all even though login is processed under hacking status of the computer.

A smart login method using messenger service according to another embodiment of the present invention notifies to the user which internet site and when a login is attempted in case of login attempt on an internet site where the user joined, by which, in case of piracy of one's own ID, the user can cope with it with real-time grasp.

And, a smart login method using messenger service according to another embodiment of the present invention may have, in case that user may allow login temporarily to a third person, a structure of method of not inputting password, but of allowing usage of the site by requesting login at the side and authenticating through a messenger, by which there is no need to notify password, and construction of strong control function which may halt the usage in case of passage of a certain usage time period can be enabled.

The effects of the present invention are not limited to the above, but other effects not described above may be clearly understood from descriptions written below by a person having an ordinary knowledge in the technical field where the present invention pertains.

BEST MODE

A smart login method using messenger service according to an aspect of the present invention to solve the technical problems may include receiving login request information from a service server by a transmitter-receiver unit of an authentication server; generating authentication request information matching to the login request information by a data management unit of the authentication server; transmitting the authentication request information to a messenger server by the transmitter-receiver unit; receiving authentication information from the messenger server by the transmitter-receiver unit; generating login information matching to the authentication information by the data management unit; and transmitting the login information to the service server by the transmitter-receiver unit.

The objects and effects of the present invention, and technical constructions to reach thereto may be clarified in reference to embodiments described in detail with attached drawings. In explanation of the present invention, in case that detailed description of publicly known function or construction is judged to blur unnecessarily the gist of the present invention, the detailed explanation thereof may be omitted. And, terminologies used below may be terms defined in consideration of functions in the present invention, which may be varied according to intention, convention or the like of user or operator.

However, the present invention may not be limited to the embodiments disclosed hereinafter but can be implemented in a variety of different forms each other. The present embodiments may be provided only to have the disclosure of the present invention be complete, and to have the scope of the invention be known completely to a person having an ordinary knowledge in the technical field where the present invention pertains, which may be defined only by the scope of claims. Therefore, the definition may be derived based on the whole content of the specification.

In the whole specification, when a certain portion is said to "include" or "provide" a certain construction element, this means, as long as there is no contrary writing, not excluding other construction elements, but allowing to further include other construction elements. And, the terms such as " . . . unit", " . . . portion", " . . . module" or the like written in the specification may mean a unit processing at least one function or movement, which may be realized with hardware, software, or a combination of hardware and software.

On the other hand, in the embodiments of the present invention, each of construction elements, function blocks or means may be constructed with one or more sub construction elements, wherein electrical, electronical, or mechanical functions performed by each of construction elements may be implemented with a variety of devices or mechanical elements publicly known such as electronic circuits, integrated circuits, ASIC (Application Specific Integrated Circuit) or the like, which may be realized separately or in integration of two or more into one.

And, combinations of each blocks of attached block diagram and each steps of attached flow chart may be performed by computer program instructions. These computer program instructions may be loaded on general-purpose computers, specific-purpose computers, portable laptop computers, network computers, mobile equipment like smartphones, online game service providing servers or processors of other programmable data processing equipment, instructions thereof performed through processors of computer apparatus or other programmable data processing equipment may generate means performing functions described at each blocks of the block diagram or each steps of the flow chart which will be described below. These computer program instructions may be stored in memories usable at computer apparatus oriented to computer apparatus or other programmable data processing equipment to implement functions with a specific method or computer readable memories, from which products including instruction means performing functions described in each blocks of the block diagram or each steps of the flow chart can be produced. The computer program instructions may be loaded on computer apparatus or other programmable data processing equipment, by which generating process for performing a series of movement steps on the computer apparatus or other programmable data processing equipment and providing steps for implementing each blocks of the block diagram and each steps of the flow chart may be enabled.

And, each block or each step may show a portion of modules, segments or codes including one or more instructions capable of being implemented to perform specific logic function(s). And, it should be noted that, in some alternative embodiments, functions referenced in blocks or steps may possibly be occurred out of sequence order. For example, two blocks or steps shown subsequently may possibly be in fact performed substantially at the same time, or the blocks or steps may be performed in reverse order according to corresponding function sometimes.

In embodiments of the present invention, the user equipment means all the computation means capable of collection, reading in, handling, processing, storing, and displaying of data such as desktop computers, laptop computers, smartphones, PDAs, portable telephones, game machines or the like. Specifically, a user equipment in embodiments of the present invention maybe an apparatus having function capable of implementing software written in interpretable code to transfer it to user. And, it can store software by itself or can read in from outside with data as occasion demands.

And, to terminals in embodiments of the present invention, not only data process functions like above, but also functions such as input, output, storing or the like may be included, for which not only a variety of elements such as CPU, main board, graphic card, hard disk, sound card, loud speaker, keyboard, mouse, monitor, USB, communication modem, or the like which general computer apparatus may have, but also CPU, main board, graphic chip, memory chip, sound engine, loud speaker, touch pad, external connect terminal such as USB or the like, communication antenna, 3G, LTE, LTEA, WiFi, Bluetooth, communication modem capable of implementing communication or the like may be included.

A variety of these elements can implement one or more functions alone, or together with two or more, or in combination of portions of each elements, and apparatus or portions thereof shown as one or more blocks in drawings or detailed description in embodiments of the present invention may mean showing one or more functions alone of, together with two or more, or in combination of portions of elements of every type included in user equipment as described above.

On the other hand, in embodiments of the present invention, user equipment, man less locker or the like may have communication function, wherein, to implement communication function, network means of every type such as wired internet, wireless internet, infrared communication, Bluetooth, WCDMA, Wibro, WiFi, LTE, LIE-A, wired or wireless telephone network or the like may be provided.

Hereinafter, a smart login method using messenger service according to an embodiment of the present invention and an apparatus thereof will be described in detail with reference to attached drawings.

Figure 1:
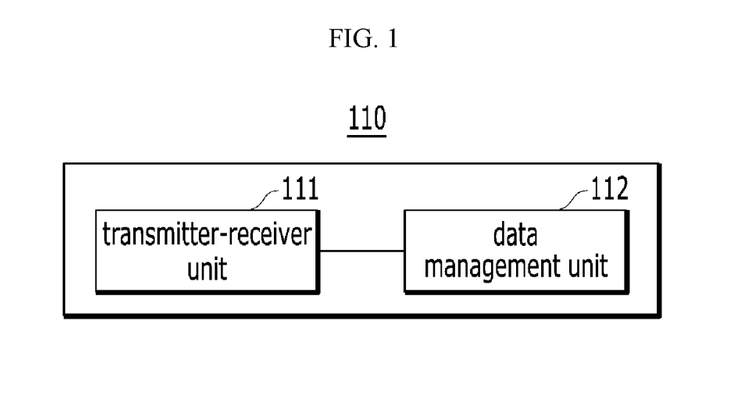
FIG. 1 is a system block diagram of the authentication server in a smart login method using messenger service according to an embodiment of the present invention.
Figure 2:
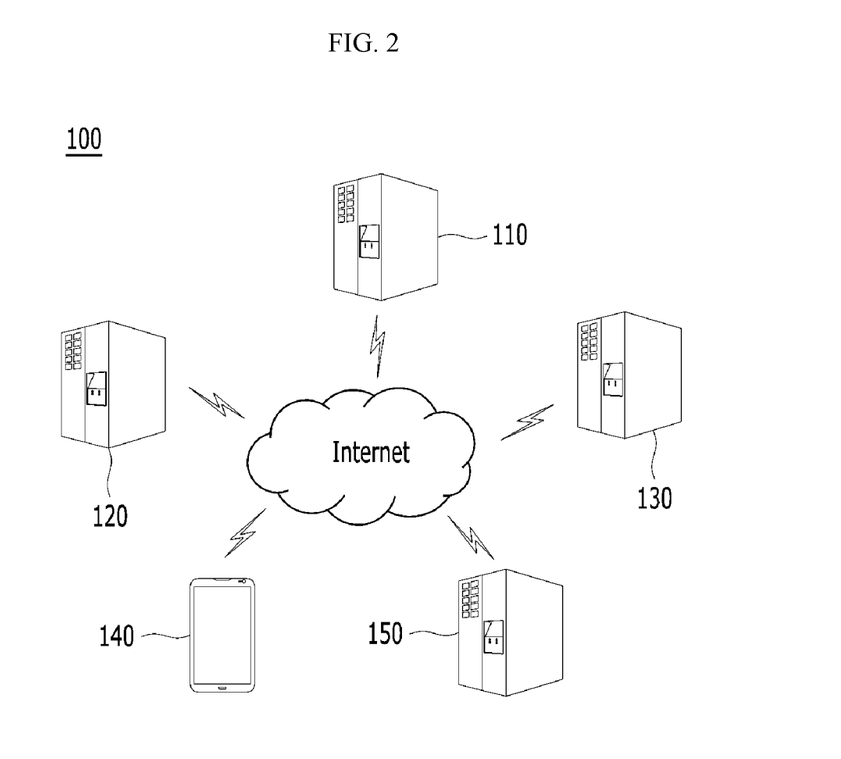
FIG. 2 is a drawing of a flow chart of the smart login method using messenger service according to an embodiment of the present invention.

FIG. 1 is a system block diagram of an authentication server 110 in a smart login method using messenger service according to an embodiment of the present invention, and FIG. 2 is a system diagram for implementing the smart login method using messenger service according to an embodiment of the present invention. The system 100 may include an authentication server 110, a service server 120, a messenger server 130, a user equipment 140 and a security server 150.

A smart login apparatus using messenger service may include the service server 120, the messenger server 130 or the security server 150, and the authentication server 110, wherein the authentication server 110 provides a transmitter-receiver unit 111 provided for transmitting or receiving login request information, authentication request information, authentication information or login information, and a data management unit 112 generating authentication request information matching to the login request information and login information matching to the authentication information.

The login request information may be corresponding to data transmitted from the service server 120 to the messenger server 130 when the login request is received from the user equipment 140. The authentication request information is data transmitted from the messenger server 130 to a specific user equipment 140 related to the login request information, which may be data including questions needed user authentication, request information such as data collection request, or the like.

The authentication information may be questions according to the authentication request information, data itself transmitted from the user equipment 140 with respect to the data collection request, or data processed therefrom.

The authentication request information may be provided in the form of requesting a certain preset information, while the authentication information may be information satisfying these requests. The certain preset information may be bio information of fingerprint or the like provided directly by user or password or the like.

And, the certain preset information may be by password information which the authentication server 110 or messenger server 130 generated by itself.

For example, the authentication server 110 may transmit the certain preset authentication information to the service server 120 and the messenger server 130 may transmit the same authentication information to the user equipment 140.

At this time, the authentication information transmitted from the authentication server 110 and the messenger server 130 may be separated physically each other to be generated from the authentication server 110 and the messenger server 130, respectively. For example, in case that the authentication server 110 may transmit the authentication request information to the messenger server 130, the messenger server 130 and the authentication server 110 may include a separate password generation portion generating the same password, wherein the authentication information may be generated through the password generation portion.

The password generation portion may, for example, generate the same password using a specific time information transmitted from the authentication server 110 to the messenger server 130 by the authentication request information.

The authentication information according to the authentication request information may be generated at the authentication server 110 and the messenger server 130, respectively, and may be provided to the user equipment 140 and the service server 120 as the same information each other, by which user's identity may be identified.

By the above matter, the certain preset authentication information transmitted to the user equipment 140 may be transmitted to the user equipment 140, by which user may input the corresponding information directly in a information input window provided at login screen which the service server 120 may provide, and the service server 120 may verify whether the information inputted in the corresponding information input window and the certain preset authentication information transmitted from the authentication server 110 may match or not to process login approval or login disapproval.

The login information may be transmitted from the messenger server 130 to the service server 120 and may be provided as information for requesting login approval or login disapproval or information for verification thereof.

The meaning of information or data described in the present specification may be the corresponding information or data itself and may be ones processed to a form of data needed in application to the user equipment 140, the messenger server 130, the security server 150, the service server 120, and the authentication server 110.

As shown in FIG. 2, the authentication server 110, the user equipment 140, the messenger server 130, the service server 120 and/or the security server 150 may be provided to be able to communicate each other. For example, the service server 120 and the messenger server 130 may be connected to be capable of data communication to the authentication server 110, respectively. The user equipment 140 may be provided to be able to communicate to be capable of performing authentication procedure with the authentication server 110 through the messenger server 130.

Figure 3:
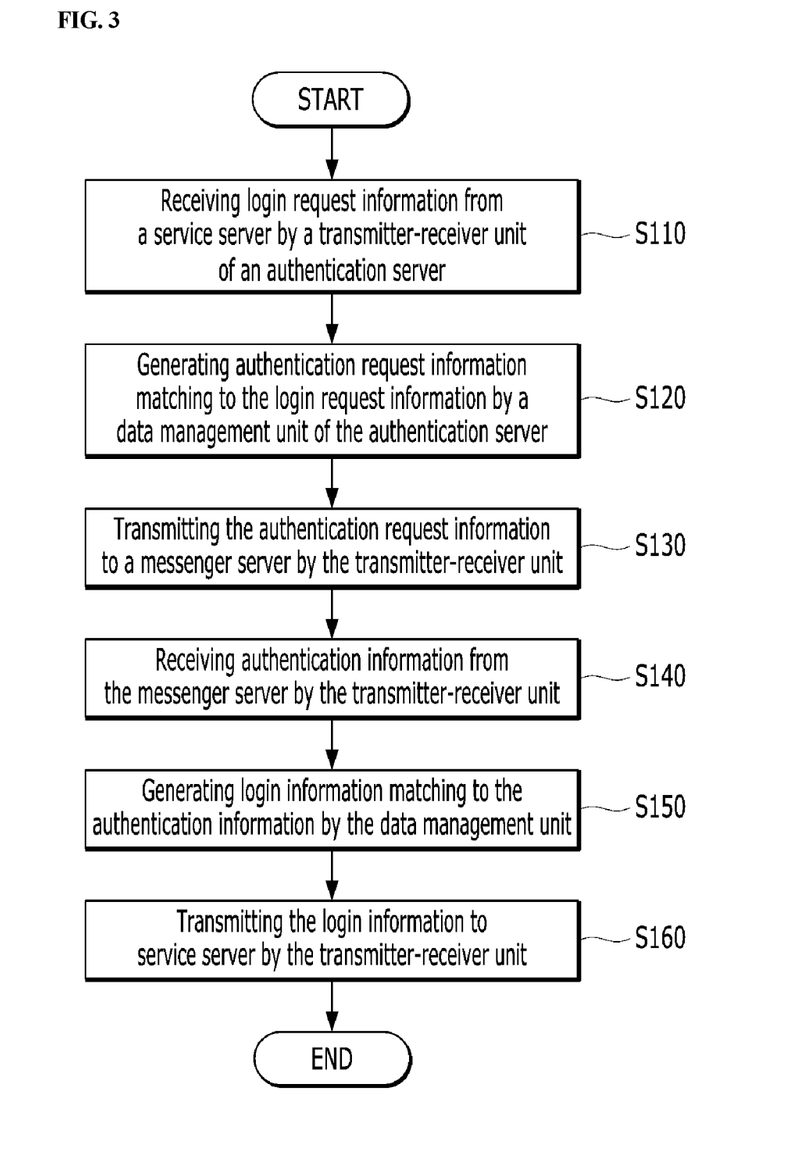
FIG. 3 is a conceptual diagram for a smart login apparatus using a messenger service according to another embodiment of the present invention, and a service server, a messenger server and user equipment.
Figure 4:
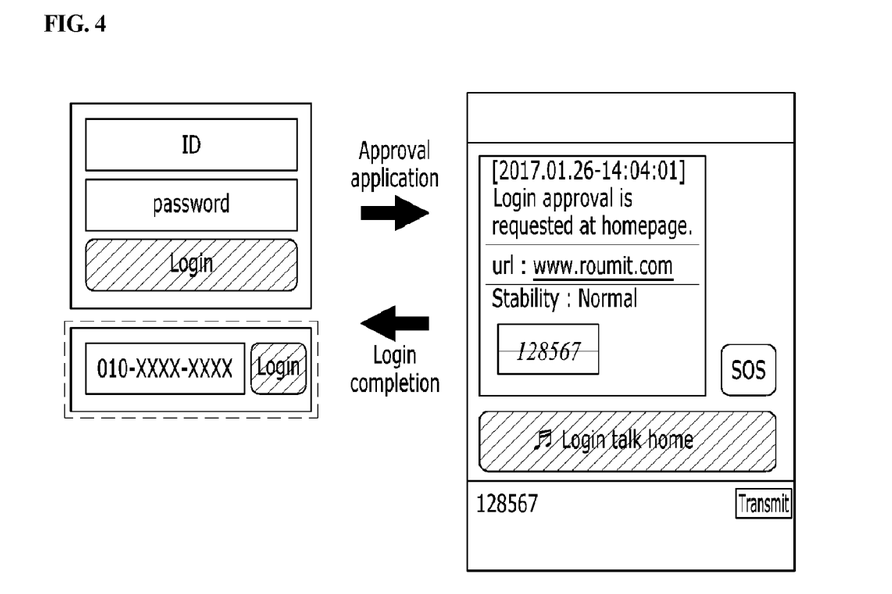
FIG. 4 is a conceptual diagram for an interface on an internet site and user equipment in which a smart login method using messenger service according to an embodiment of the present invention is realized.

FIG. 3 is a drawing of flow chart of the smart login method using messenger service according to an embodiment of the present invention, and FIG. 4 is a conceptual diagram for an interface on an internet site and a user equipment 140 where the smart login method using messenger service according to an embodiment of the present invention may be implemented.

Referring to FIG. 3 and FIG. 4, the smart login method using messenger service according to an embodiment of the present invention may include a step of receiving the login request information from the service server 120 by the transmitter-receiver unit 111 of the authentication server 110 (S110). For example, as shown in FIG. 4, a website login screen may be implemented by the service server 120.

The user may input ID and password through a login screen to login in general method. Furthermore, the user may input the user information in the lower end dotted line and click the login button on the right side, by which the service server 120 may generate the login request information needed in login to transmit to the authentication server 110.

The transmitter-receiver unit 111 of the authentication server 110 may receive the login request information, wherein the login request information may include a personal identification number (for example, resident registration number), telephone number information (for example, portable telephone number) or ID information of user requesting login to an internet service provided by the service server 120. On the other hand, the information and the like may not be limited to the above, but the case of corresponding to information to enable identification of user's identity through the user equipment 140 controlled real-time by the user may be included to the login request information.

Next, a step generating the authentication request information matching the login request information by the data management unit 112 of the authentication server 110 may be included (S120). The authentication request information may be linked to the user on the messenger server 130 matching to the personal identification number or the like included in the login request information to be provided to be transmitted to the user equipment 140.

The authentication request information may be provided as information capable of being transmitted to the user equipment 140 to be used at the time of authentication. For example, the authentication request information may be provided, as the user equipment 140 screen shown in FIG. 4, to be provided to input authentication number for the user to input number to perform authentication.

Next, a step of transmitting the authentication request information to the messenger server 130 by the transmitter-receiver unit 111 may be included (S130). The authentication server 110 may transmit the authentication request information for the user, by which whether it corresponds to a specific user needing authentication or not may be verified using telephone number and ID information and the like of the user equipment 140 (smartphone) used by the user to verify identity of information of user equipment 140 stored in the authentication server 110.

As illustrated in FIG. 4, the authentication server 110 and the user may be provided with ID in advance which can be used at messenger service, respectively, wherein the user ID at the messenger service may be included in the authentication request information, by which the authentication request information may be transmitted to the user through the messenger service.

The authentication server 110 may transmit the authentication request information in message form to the user on the messenger server 130 corresponding to the telephone number and ID of the user equipment 140, by which an authentication procedure may be realized even though the application using a separate authentication procedure may not be provided.

At this time, the step transmitting the authentication request information may further include a step of transmitting an authority restriction verification information to the messenger server 130 through the transmitter-receiver unit 111 by the data management unit 112 and a step of receiving an authority restriction information from the messenger server 130 through the transmitter-receiver unit 111 to transmit a service restriction request information according to the authority restriction information to the service server 120.

The service restriction request information may be any one of login cancellation information, usage time restriction information and function restriction information. The user equipment 140 may be transmitted the authority restriction verification information from the messenger server 130. The authority restriction verification information may be prepared to match to the service restriction request information.

The data management unit 112 may further include a step of transmitting a login status information corresponding to the login information through the transmitter-receiver unit 111 to the messenger server 130. For example, in case that there is no need to maintain the login status any more, a logout function provided by the service server 120 may be used, while when a login cancellation information may be transmitted through the user equipment 140 according to authority restriction verification information transmitted from the messenger server 130 received to the user equipment 140, the login cancellation (logout) may be realized at the internet site of the service server 120.

And, through usage time restriction information, login cancellation can be realized at internet site. In this case, parents of minors may preset a usage time relating service providing at site where children are accessing to restrict service usage. As another example, there may be a case that person to access to the internet site through a temporary login function or through actual login of minors or the like and person capable of setting restriction on whether login or not such as legal representatives or the like may be separated.

Even though not shown, a button portion of 'Where are you' may be provided on a touch display portion of the user equipment 140 used by the legal representative such as parents or the like who may want to approve login. And, an icon of 'Notification of my location' may be provided on a login screen of internet site where the child of minor wants to login. When the child of applicant clicks the icon of 'Notification of my location', current location information of child may be provided to the user equipment 140 of parents, which may be compared to information on location where the internet site access is tried actually, by which the matching on whether the child may request approval on the internet site access actually may be judged.

On the other hand, by letting be activated for only a portion of functions from a variety of services provided at the internet site and setting function of reading prevention or the like of personal information at the time of login of a third person, unnecessary leakage of information may be provided to be blocked out in advance.

For example, in case of approval of login of a third person, a list of functions provided at the internet site may be provided to the user through the user equipment 140, and based on the user's input, information on the functions to be allowed or blocked out among functions provided at the internet site may be provided to the service server 120. For further specific example, a list of mail, chatting, cloud, cafe, or the like may be provided as functions provided at the internet site, and usage of a portion of functions may be provided to be restricted such as mail function among these functions may be restricted to the third person who does login according to user's choice.

Next, a step of receiving the authentication information from the messenger server 130 by the transmitter-receiver unit 111 may be included (S140). The transmitter-receiver unit 111 of the authentication server 110 may receive authentication information from the messenger server 130. The authentication information may be information on whether login is permitted or not of the internet site provided by the service server 120, by which whether the login information described below should be generated or not may be determined.

At this time, the authentication information may be generated using any one of text information, fingerprint recognition information, pattern recognition information, voice recognition information and iris recognition information. The user equipment 140 may be provided as smartphone, tablet computer, desktop computer, or the like, and each of devices may collect authentication information using a variety of input means, by which, in case of generation of authentication information using user's information on fingerprint or iris, security can be further reinforced, and convenience can be improved. The authentication information may be generated selectively or by specific combination through the user equipment 140.

Next, a step of generating login information matching to the authentication information by the data management unit 112 may be included (S150). After the authentication request information transmitted to the messenger server 130 through the transmitter-receiver unit 111 of the authentication server 110 may be dispatched, the authentication information for the authentication request information may be received from the messenger server 130, wherein such a authentication information may be transformed to the login information to be transmitted to the service server 120. The login information may contain any one information of login approval or login disapproval.

In the authentication request information, in order to facilitate notification of login not allowed of a third person or the like, emergency connection information enabling direct communication to an operator of the authentication server 110 may be included to be provided. As illustrated in FIG. 4, on the screen of the user equipment 140, an icon of telephone receiver shape including a text of 'SOS' may be provided. And, in an interface implemented on the user equipment 140, a link information may be included to facilitate direct access to the internet site which the authentication server 110 may provide. An icon including 'note symbol' and 'Login talk home' in FIG. 4 is corresponding to a link button facilitating direct access to the site provided by the authentication server 110.

And, as shown in FIG. 4, in the authentication request information, internet site homepage information operated by the specific service server 120 where the login approval is requested, date and time when the approval is requested, and link information of the corresponding internet site may be included. Furthermore, information on whether security of the corresponding internet site is established stably or not (for example, stability: normal) may be further included. For the above, the data management unit 112 of the authentication server 110 may collect and analyze security status information on each of service servers 120 capable of receiving login approval request by the user through the transmitter-receiver unit 111 at a preset interval.

The messenger server 130 may transmit authentication request information and authority restriction information to the user equipment 140 sequentially or simultaneously to complete authority restriction information from the user equipment 140. The authentication server 110 receiving the authority restriction information may generate service restriction request information according to authority restriction information to transmit it to the service server 120, wherein in case of authority restriction information may also be transmitted to the security server 150 through the transmitter-receiver unit 111 to be stored and managed separately.

On the other hand, the step of receiving the login request information by the transmitter-receiver unit 111 of the authentication server 110 may further include step of receiving third user temporary usage application information from the service server 120 to transmit to the messenger server 130.

Figure 5:
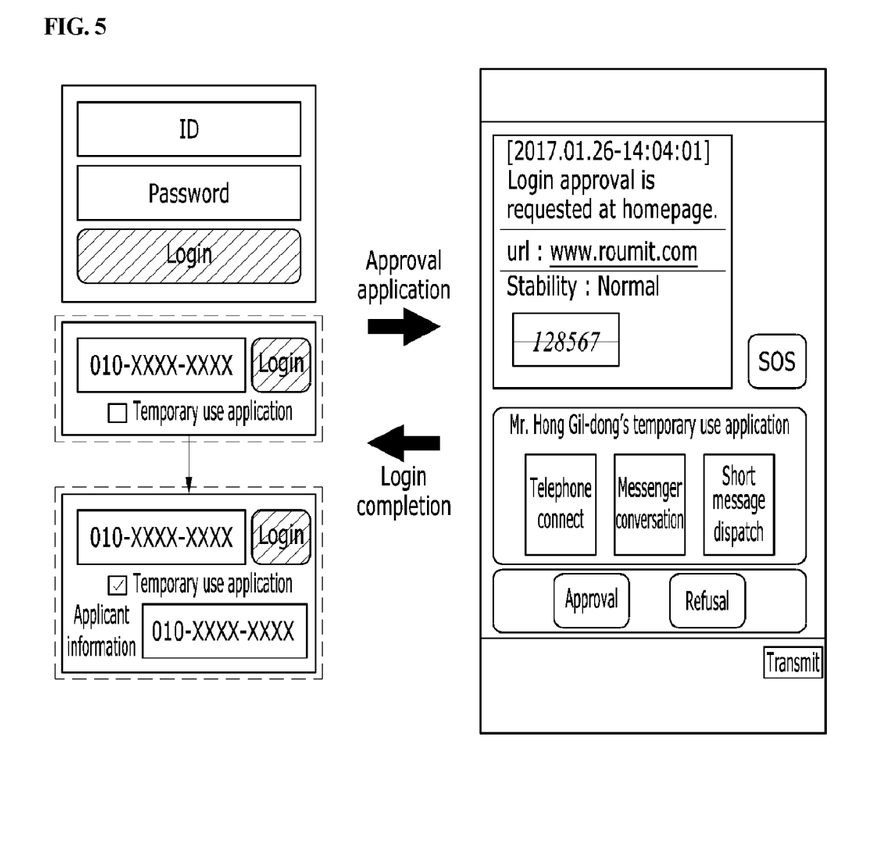
FIG. 5 is a second conceptual diagram for an interface on an internet site and user equipment in which a smart login method using messenger service according to an embodiment of the present invention.

FIG. 5 is a second conceptual diagram for an interface on the internet site and the user equipment where the smart login method using messenger service according to an embodiment of the present invention is implemented.

Referring to FIG. 5, the user may input user information in lower end dotted line and may select 'temporary usage application' below. In this case, in the applicant information item implemented in the interface besides user information, applicant's portable telephone number or the like corresponding to the applicant information may be inputted.

The transmitter-receiver unit 111 of the authentication server 110 may receive applicant's identification information (for example, portable telephone number) and login request information, wherein the login request information may include personal identification number (for example, resident registration number), telephone number information (for example, portable telephone number) or ID information of user requesting login to the internet service provided by the service server 120.

However, the information or the like may not be limited to the above, but the case corresponding to information facilitating identifying user's identity through the user equipment 140 controlled in real-time by the user may be included in the login request information.

Next, the data management unit 112 of the authentication server 110 may perform a step generating the authentication request information matching the login request information, wherein the authentication request information may be provided to be linked to the user on the messenger server 130 matching to the personal identification number or the like included in the login request information to be transmitted to the user equipment 140. At this time, the applicant's portable telephone number information may be transmitted to the messenger server 130 together with it.

The applicant's identification information may not be limited only to the portable telephone number as information facilitating identifying user's identity, but personal identification number (for example, resident registration number), telephone number information (for example, portable telephone number) or ID information enabling identifying applicant's identity may be included.

The authentication request information may be transmitted to the user equipment 140 to be provided as information usable at the time of authentication. For example, the authentication request information may, as the screen of the user equipment 140 as shown in FIG. 5, be provided to input an authentication number to be provided to be able to perform authentication by input number by the user.

Furthermore, as shown in FIG. 5, information facilitating to notify that it is by a third applicant's temporary usage application may be shown on the display portion of the user equipment.

In the user equipment, selection buttons of 'telephone connection', 'messenger conversation', and 'short message dispatch' as shown in FIG. 5 may be provided. Through the above, whether temporary usage request is come from a third applicant may be verified.

In case that the user clicks the messenger conversation button, the messenger server 130 may provide the messenger service facilitating transmitting and receiving message between the third user matching to the portable telephone number of received applicant and the user.

The user may be situated automatically in a status in which conversation with the third applicant may be possible through a messenger. Accordingly, the third applicant joined to the messenger server 130 by using a portable telephone information stored in the messenger server 130 and the user may send and receive message each other through the messenger service, by which whether the temporary use approval request is by the third applicant who actually applied for the temporary use may be verified.

In case of approval of temporary use according to the temporary usage request, by selecting an 'approval' button at lower end of the user equipment screen shown in FIG. 5, applicant's temporary use may be realized. And, for a case that user may reject the temporary usage request, a 'refusal' button may be additionally provided.

Next, a step of transmitting the login information to the service server 120 by the transmitter-receiver unit 111 may be included (S160). After the login information is transmitted to the service server 120, the service server 120 may allow login of site in case of login approval.

In case of login approval, the login may be realized without passing through an input procedure of ID and password required by the service server 120. Accordingly, the user can perform login by a smart login method using messenger service according to an embodiment of the present invention even though the user cannot remember ID and password corresponding thereto of the internet site providing service provided by each of the service server 120.

And, according to some embodiments of the present invention, in case that a third applicant does login by approval of temporary use according to temporary usage request, succeeding management functions may be provided.

For example, in case that a third applicant did logout, the service server 120 may provide a notification message notifying that the third applicant did logout to the user equipment 140. The transmission of these notification message may be provided through messenger server 130 without discrimination to authentication request information, which may be provided in a different method according to selection. For different example, the service server 120 may provide a notification message for functions that the third applicant uses in login status. For more detailed example, the service server 120 may, in case that the third applicant uses mail function, provide a notification message therefor to the user equipment 140.

For other example, the service server 120 may, in case that it is requested of logout of the third applicant from the user equipment 140, cancel the login status of the third applicant.

For further other example, it may include a step of receiving login request information from the service server 120 by the transmitter-receiver unit 111 of the authentication server 110, a step of generating authentication request information matching to the login request information by the data management unit 112 of the authentication server 110, a step of transmitting the authentication request information to the messenger server 130 by the transmitter-receiver unit 111, a step of generating a first authentication information using the authentication request information by the data management unit 112, a step of receiving a second authentication information from the service server 120 by the transmitter-receiver unit 111, a step of generating login information matching to the first authentication information or the second authentication information in case that the data management unit 112 verifies that the first authentication information and the second authentication information are matching, and a step of transmitting the login information to the service server 120 by the transmitter-receiver unit 111.

And, the second authentication information may be transmitted from messenger server 130.

For example, the authentication information transmitted from the authentication server 110 and the messenger server 130 may be separated physically each other to be generated from each of the authentication server 110 and the messenger server 130, by which, in case that the authentication server 110 transmits the authentication request information to the messenger server 130, the messenger server 130 and the authentication server 110 may generate authentication information through a separate password generation portion facilitating to generate the same password based on the same time information respectively, to be able to transmit to the user equipment and the service server 120.

As information for generating password corresponding to the first authentication information and the second authentication information, time information may be used, which is not to be limited to it, but a variety of information may be utilized as it demands.

The user may login without inputting ID or password by inputting authentication information through an authentication information input window provided on an internet site screen provided by the service server 120.

And, in case of login disapproval, the service server 120 may maintain self-login security through procedure or the like of self-authentication number restriction.

In case that login information includes information of login disapproval, in succession to the step of transmitting login information to the service server 120, a step of transmitting login information to the security server 150 by the transmitter-receiver unit 111 of the authentication server 110 may be performed. At this time, the security server 150 may, in case of login approval or login disapproval, be provided to store each of log data to provide each of log data by request of the data management unit 112 of the authentication server 110.

The data management unit 112 of the authentication server 110 may facilitate to transmit login maintenance verification information to the messenger server 130 through transmitter-receiver unit 111 by a preset time interval. The implementation of the user equipment 140 where the authentication for login is realized and the internet site where the internet service is provided may be implemented on different devices respectively, by which login maintenance verification information may be transmitted to the user equipment 140 by a preset time interval, to facilitate to notify whether login cancellation or not to the user.

Accordingly, even in the case that the internet site by the service server 120 does not provide with service to cancel login automatically after a certain time, the user may verify whether maintenance of login status or not periodically through the user equipment 140.

In the present invention, reply on the authentication request information may not be limited to authentication number input shown in FIG. 4, but may be provided in a variety of methods.

The authentication request information according to some embodiments of the present invention may be information requesting transmission of authentication result judged based on input of bio information using the user equipment 140 or bio information at the user equipment 140. In case that these authentication request information requests input of bio information, the password generation portion provided at the service server 120 and the messenger server 130 may be omitted according to selection. And, instead of the password generation portion, a comparative bio information storage portion storing comparative bio information to be used as comparative data in authentication of acquired bio signal may be provided at least one of the service server 120 and the messenger server 130.

In case that the authentication request information requests input of bio information, the authentication request information may include information on type of bio information for which input is requested. The type of bio information may a type of bio information to be used in authentication such as fingerprint, face, voice and iris information and the like.

The input of bio information requested in authentication request information may be inputted through an input apparatus provided on the user equipment 140. For example, the user equipment 140 may provide input means capable of inputting bio information such as camera, fingerprint sensor, microphone or the like. More specifically, in case of information on face and iris, it may be inputted through a camera, and in case of fingerprint information, it may be acquired through a fingerprint sensor. And, in case of voice information, it can be acquired through a microphone.

Hereinafter, with an example of fingerprint, movement of a case in which input of bio information is requested at authentication request information will be described.

As in some embodiments of the present invention, in case that authentication request information is provided to the user equipment 140 through messenger, the user equipment 140 can obtain authentication request information through pre-installed messenger application.

The user equipment 140 may output acquired authentication request information through a messenger application, wherein, in outputted authentication request information, bio information for requesting input, that is, request for input of fingerprint information and bio signal input object capable of selecting whether processing input of fingerprint information or not may be included.

The user equipment 1400 may, in case that bio signal input object is selected, connected to a bio authentication application installed in advance to acquire fingerprint information.

Since input of bio information is not supported generally in messenger applications, linkage to a pre-installed bio authentication application may be needed for input of bio information.

On the user equipment 140, bio authentication application may be installed in advance with which processes for acquiring bio information required in authentication request information can be progressed, and in case that these bio authentication application is not installed, a notification message can be outputted to notify that bio authentication application should be installed to the user. And, a connection to a market, homepage or the like at which a bio authentication application can be installed may be provided according to selection. When connected to a pre-installed bio authentication application to obtain fingerprint information, the bio authentication application may request input of fingerprint information to the user.

And, the user equipment 140 may output a guide message on the input method of the fingerprint information through the bio authentication application. For example, the user equipment 140 may request contacting finger to the fingerprint sensor provided at the user equipment 140 for input of fingerprint information through the bio authentication application. Here, acquisition of fingerprint information does not need to be performed through finger contact to the fingerprint sensor but may be provided in a variety of ways according to fingerprint information acquisition method supported by the user equipment 140.

And, the user equipment 140 may acquire fingerprint information through provided fingerprint sensor, and the acquired fingerprint information 140 may be transmitted as a response to authentication request information.

In the above description, an authentication request information including bio information has been described with example of fingerprint information, which is not limited, but a variety of bio information such as face, voice and iris information and the like may be inputted by cited request information, to be transmitted as a reply for the authentication request information. For example, as a reply for authentication request information including bio information, bio information may be meant to be transmitted as an authentication information. And, in case that bio information may reply by authentication request information including bio information, bio information may replace the authentication number inputted according to the authentication request information in prior described authentication performance.

And, according to some embodiments of the present invention, as a reply for authentication request information including bio information, bio information itself is no need to be transmitted, but an authentication result based on bio information performed by the user equipment 140 itself may be transmitted as the reply according to selection.

For example, the user equipment 140 may judge whether an acquired bio information agrees to a reference bio information stored in advance or not. Here, judging whether the acquired bio information agrees to the reference bio information or not may be judged in reference of whether the acquired bio information and the reference bio information agrees completely to each other, to which it may not be limited, but may be judged as being agreed in case of similarity of the same or more than that determined in advance based on the similarity of the acquired bio information and the reference bio information.

And, the user equipment 140 may judge as an authenticated user in case that the acquired bio information and the reference bio information agrees, by which the authentication result may be transmitted as the reply for the authentication request information including the bio information.

In the present specification and drawings, even though some desirable embodiments of the present invention have been disclosed and some specific terms have been used, this usage is not to limit the scope of the present invention, but only for general meaning for easy explanation of technical content of the present invention and for helping understanding of the invention. It is obvious to persons having an ordinary knowledge in the technical field where the present invention pertains that other modified embodiments based on the technical idea of the present invention besides the embodiments disclosed herein may be able to be implemented.

What is claimed is:

1. A smart login method using messenger service, in a communication system where at least one or more user equipment, an authentication server, an additional service server, and a messenger server are connected so as to be capable of communication through wired or wireless communication network, comprising:

transmitting (1) login request information including a personal identification number (Unique Identifiable Information) to the authentication server in order to input the personal identification number set in advance on a login screen of a certain website operated by the additional service server connected using an arbitrary user equipment to request login from the additional service server;

generating (2) authentication request information for a user equipment registered in advance matched in linkage of the login request information to transmit the generated authentication request information to the messenger server by the authentication server;

delivering a login approval guide message to the user equipment so as to be displayed through a certain messenger or an application implemented on a user equipment registered in the authentication server in case that the messenger server receives the authentication request information;

implementing login approval from the login approval guide message displayed on the certain messenger or the application implemented on the user equipment registered in the authentication server; and generating (3) authentication information and permitting login to transmit to the authentication server in case that the messenger server judges that the implementation of the login approval is realized normal;

generating (4) login information which matches with the authenticating information via the authentication server and delivering the login information to the additional service sever; and permitting login of the certain website in case that the additional service server receives the login information normally.

2. The smart login method using messenger service according to claim 1, further comprising:

requesting an encryption process for the login request information to a code generation portion provided inside or to a security server installed outside to be separated physically by the authentication server; and processing encryption of the login request information to transmit the encrypted login request information to the authentication server by the code generation portion or the security server.

3. The smart login method using messenger service according to claim 1, further comprising:

displaying a message notifying that a login approval message is transmitted to the messenger server on the screen of the user equipment by the additional service server in case that the user equipment implements login request.

4. The smart login method using messenger service according to claim 1, wherein the implementing login approval at the messenger or the application further comprises:

implementing movement from the screen of the messenger or the application to an approval screen by the user of the messenger or the application;

providing login approval screen to the screen of the messenger or the application according to implementation of movement to the approval screen by the messenger or the server; and implementing login approval at the login approval screen by the user of the messenger or the application.

5. A smart login apparatus using messenger service, comprising:

at least one or more user equipment inputting a preset personal identification number (Unique Identifiable Information) in a login screen of a certain connected web site to transfer (1) login request information including the personal identification number to request login to the authentication server, or implementing login approval at a certain messenger or an application implemented inside in a physically separated or not separated status;

an authentication server generating (2) authentication request information for the user equipment registered in advance to be matched in linkage to the login request information and generating (4) login information which matches with an authenticating information in case by receiving the authenticating information that permits login;

a messenger server delivering the login approval guide message so as to be displayed through a certain messenger or an application implemented on the user equipment registered in the authentication server, and generating (3) authentication information that permits the login to transmit to the authentication server in case that the authentication request information transmitted from the authentication server is received; and an additional service server receiving the login request information to transmit to the authentication server and permitting login of the certain website when the login information transmitted from the authentication server is received normally, wherein the personal identification number for identification to be matched in linkage to each of the user equipment registered in advance is stored and managed respectively between the additional service server and the authentication server, wherein at least one or more identifiers for identification to be matched in linkage to each of the user equipment registered in advance are stored and managed respectively between the authentication server and the messenger server.

6. The smart login apparatus using messenger service according to claim 5, further comprising:

a security server being installed to be separated physically from the authentication server and processing encryption of the login request information according to request of the authentication server to deliver to the authentication server.

7. The smart login apparatus using messenger service according to claim 5, wherein the additional service server displays a message notifying that login approval message is transmitted to a preset messenger server on the screen of the user equipment in case that the user equipment implements login request.

8. The smart login apparatus using messenger service according to claim 5, wherein the messenger server displays login approval screen on the screen of the messenger or the application when the user of the messenger or the application implements movement of approval screen from the screen of the messenger or the application.

9. The smart login apparatus using messenger service according to claim 5, wherein the login screen of the user equipment comprises:

a first information input window and a first login button for input of each of user ID and password, and/or a second information input window and a second login button for input of the user innate identification number.

10. The smart login apparatus using messenger service according to claim 5, wherein the additional service server generates the login request information using any one of the personal identification number, terminal number or ID.

11. The smart login apparatus using messenger service according to claim 5, wherein the authentication server generates the authentication information using any one of text information, fingerprint recognition information, pattern recognition information, voice recognition information and iris recognition information.

12. The smart login apparatus using messenger service according to claim 5, wherein the authentication server is configured by a transmitter-receiver unit receiving information delivered to the authentication server or transmitting information for delivery to outside; and a data management unit generating authentication request information matched to the login request information or generating login information for the user equipment registered in advance to be matched in linkage to the authentication information.

13. The smart login apparatus using messenger service according to claim 5, wherein in case that an arbitrary third user inputs personal identification number of a first or a second user equipment on a login screen of a certain website connected using a third user equipment to request login, the authentication server delivers the login approval guide message to the messenger or the application implemented on the user equipment to permit login temporarily to the third user.

14. The smart login apparatus using messenger service according to claim 5, wherein, in case that a preset authority restriction verification information is included in the authentication request information, the additional service server transmits a service restriction request information according to the authority restriction information to the user equipment or other user equipment.

15. The smart login apparatus using messenger service according to claim 5, wherein the messenger server is a server which a business operator of the additional service server operates or one selected from a plurality of servers which a third business operator operates so as to be installed to be separated physically.

16. The smart login apparatus using messenger service according to claim 5, wherein, in case that the user performs connection to the certain website and login authentication using one user equipment, the messenger or the application which the messenger server provides is implemented at the user equipment.

17. A smart login apparatus using messenger service, comprising:

at least one or more first user equipment transmitting (1) login request information including a preset personal identification number (Unique Identifiable Information) to input the personal identification number in login screen of a connected certain website to request login to the authentication server;

at least one or more second user equipment implementing login approval through a certain messenger or an application implemented inside;

an authentication server generating (2) authentication request information for the second user equipment registered in advance to be matched in linkage to the login request information and generating (4) login information which matches with an authenticating information in case by receiving the authenticating information that permits login;

a messenger server delivering the login approval guide message so as to be displayed through the certain messenger or the application implemented on the second user equipment registered in the authentication server, and generating (3) authentication information that permits the login to transmit to the authentication server in case that the authentication request information transmitted from the authentication server is received; and an additional service server receiving the login request information to transmit to the authentication server and permitting login of the certain website of the first user equipment when the login information transmitted from the authentication server is received normally, wherein the personal identification number for identification to be matched in linkage to each of the user equipment registered in advance is stored and managed respectively between the additional service server and the authentication server, wherein at least one or more identifiers for identification to be matched in linkage to each of the user equipment registered in advance are stored and managed respectively between the authentication server and the messenger server.

18. The smart login apparatus using messenger service according to claim 16, wherein, in the login screen of the user equipment, a first information input window and a first login button for input of each of user ID and password, and/or a second information input window and a second login button for input of the user innate identification number are displayed.

* * * * *